(12) United States Patent
Park

(10) Patent No.: US 8,049,853 B2
(45) Date of Patent: Nov. 1, 2011

(54) LIQUID CRYSTAL DISPLAY DEVICE AND METHOD OF FABRICATING THE SAME

(75) Inventor: Cheol-Woo Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 368 days.

(21) Appl. No.: 12/005,621

(22) Filed: Dec. 28, 2007

(65) Prior Publication Data

US 2008/0158493 A1 Jul. 3, 2008

(30) Foreign Application Priority Data

Dec. 29, 2006 (KR) .................. 10-2006-0138494

(51) Int. Cl.
*G02F 1/1343* (2006.01)

(52) U.S. Cl. ................ 349/139; 349/153; 349/190

(58) Field of Classification Search .............. None
See application file for complete search history.

(56) References Cited

U.S. PATENT DOCUMENTS

| | | | |
|---|---|---|---|
| 7,212,263 B2 * | 5/2007 | Jeoung et ............... | 349/110 |
| 7,583,350 B2 * | 9/2009 | Chang et al. ........... | 349/153 |
| 7,898,635 B2 * | 3/2011 | Yim et al. ............... | 349/155 |
| 2003/0122978 A1 | 7/2003 | Lim | |
| 2004/0174484 A1 | 9/2004 | Matsumoto | |
| 2006/0139553 A1 * | 6/2006 | Kang et al. ............. | 349/149 |
| 2008/0002134 A1 * | 1/2008 | Jeong .................... | 349/153 |
| 2008/0129945 A1 * | 6/2008 | Kim ....................... | 349/153 |

* cited by examiner

*Primary Examiner* — Thanh-Nhan Nguyen

(74) *Attorney, Agent, or Firm* — McKenna Long & Aldridge, LLP

(57) ABSTRACT

A liquid crystal display device includes a first substrate and a second substrate each including an active area and a non-active area; a black matrix on the first substrate in the non-active area; a color filter layer on the black matrix; a common electrode on the color filter layer and black matrix; an array element on the second substrate in the active area; a plurality of signal lines and a common bridge line in the non-active area; a protective layer on the array element, signal lines and a common bridge line; a transparent pattern connected to the common bridge line and extending to a border region between the active and non-active areas; a seal pattern formed in an edge portion of the first and second substrates; and a liquid crystal layer interposed between the first and second substrates.

10 Claims, 7 Drawing Sheets

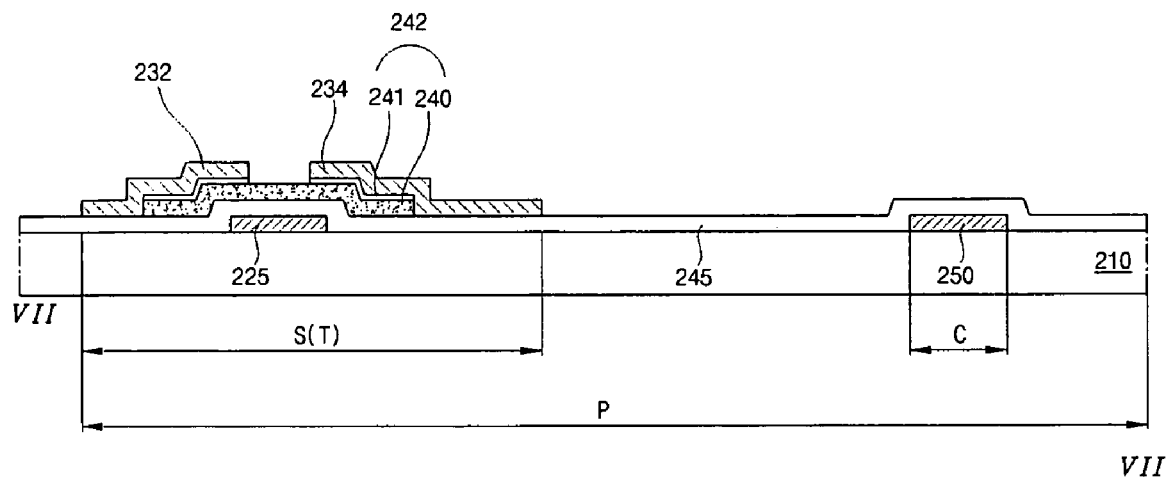
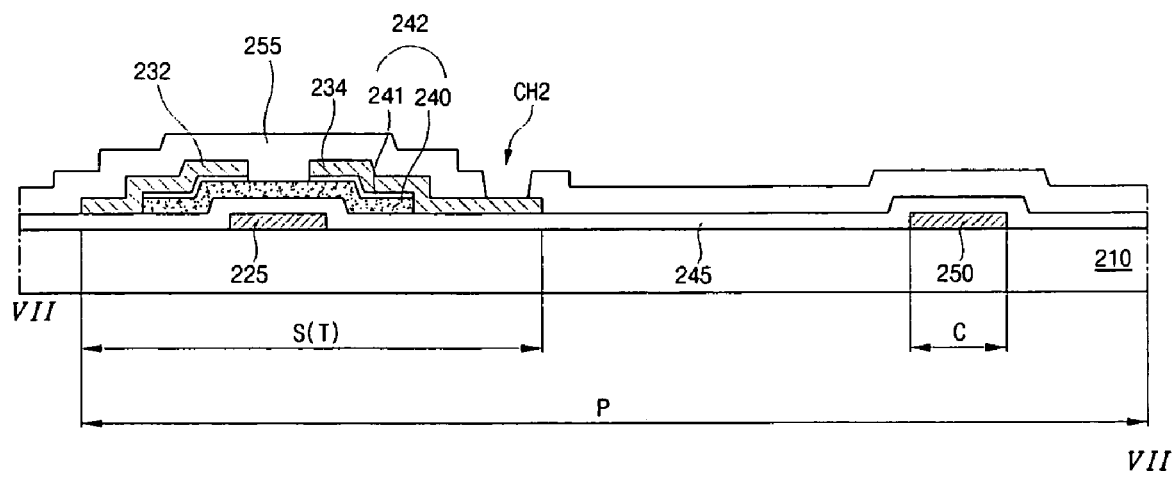

LIQUID CRYSTAL DISPLAY DEVICE AND METHOD OF FABRICATING THE SAME

The present application claims the benefit of Korean Patent Application No. 2006-0138494, filed in Korea on Dec. 29, 2006, which is hereby incorporated by reference for all purposes as if fully set forth herein.

BACKGROUND OF THE INVENTION

1. Field of the Invention

The present invention relates to a liquid crystal display (LCD) device and the method of fabricating the same, and more particularly to a method of fabricating the LCD device to prevent a malfunction due to the continuous inflow of direct current voltage into the outermost area of the LCD device.

2. Discussion of the Related Art

Typical liquid crystal display (LCD) devices use an optical anisotropic property and polarization properties of liquid crystal molecules to display images. The liquid crystal molecules have directional orientation characteristics resulting from their thin and long shape. An arrangement direction of the liquid crystal molecules can be controlled by applying an electrical field. Accordingly, when the electric field is applied, the polarization properties of light are changed according to the arrangement of the liquid crystal molecules such that the LCD devices display images.

The LCD device includes a first substrate, a second substrate and a liquid crystal layer interposed therebetween. A common electrode and a pixel electrode are respectively formed on the first and second substrates. The first and second substrates may be referred to as a color filter substrate and an array substrate, respectively. The liquid crystal layer is driven by a vertical electric field induced between the common and pixel electrodes. The LCD device usually has excellent transmittance and aperture ratio.

Among the known types of LCD devices, active matrix LCD (AM-LCD) devices, which have thin film transistors (TFTs) arranged in a matrix form, are the subject of significant research and development because of their high resolution and superior ability to display moving images.

FIG. 1 is a plan view of a pixel region of the array substrate according to the related art. As shown in FIG. 1, a plurality of gate lines 120 and a plurality of data lines 130 are formed on the substrate 110. The gate and data lines 120 and 130 cross each other to define a pixel region P on the substrate 110. A common line 150 spaced apart from each of the gate lines 120 is formed in the middle of the pixel region P.

A TFT "T" including a gate electrode 125, a semiconductor layer (not shown), a source electrode 132 and a drain electrode 134 is disposed at a crossing portion of the gate and data lines 120 and 130. The gate electrode 125 and the source electrode 134 are connected to the gate lines 120 and the data lines 130, respectively. The source and drain electrodes 132 and 134 are spaced apart from each other on the semiconductor layer. A pixel electrode 170 is formed in the pixel region "P" and contacts the drain electrode 134 through a drain contact hole CH1.

Accordingly, the common line 150 functions as a first electrode of a storage capacitor Cst. The pixel electrode 170 overlapped with a part of the common line 150 functions as a second electrode of the storage capacitor Cst. Therefore, the first and second electrodes and a gate insulating layer (not shown) made of a dielectric material and between the first and second electrodes constitute the storage capacitor Cst.

FIG. 2 is a plan view showing an outermost area of an array substrate for the LCD device according to the related art. As shown in FIG. 2, an array substrate 110 includes an active area AA and a non-active area NAA. The active area AA is a region in which images are displayed and the non-active area NAA is a region in which images are not displayed. The signal for the active area AA is transmitted through the signal line 165 and the common bridge line 175. Although not shown in FIG. 2, the signal line 165 may include diverse signal lines such as a gate bridge line, a data bridge line and a multi pattern search line. The diverse signal lines may be spaced apart from one another.

Since the common bridge line 175 is connected to the common line 150 (of FIG. 1), a common signal can be transmitted from a common voltage generator (not shown) on the array substrate 110 to the common electrode (not shown) on a color filter substrate (not shown) via the common bridge line 175. When the LCD device is driven, the voltage of the signal line 165 is not equal to the voltage of the common electrode at the non-active area NAA. Since the non-equality causes the potential difference between the common electrode and the signal line 165, direct current voltage DCV is continuously generated. The direct current voltage DCV continuously generated influences an array element (not shown) formed at the active area AA of the array substrate 110 via a liquid crystal layer (not shown). As a result, malfunctions such as flicker, cross talk and image sticking can occur in the LCD device.

FIG. 3 is a cross-sectional view taken along lines III-III of FIG. 2. As shown in FIG. 3, the LCD device includes a first substrate 105, a second substrate 110 and a liquid crystal layer 115 interposed therebetween. The first and the second substrates 105 and 110 face and are spaced apart from each other. The first and second substrates 105 and 110 include an active area AA and a non-active area NAA. The active area AA is a region in which images are displayed and the non-active area NAA is a region in which images are not displayed.

Moreover, a seal pattern 195 is formed at the edge portion of the first and second substrates 105 and 110. The seal pattern 195 may be made of thermosetting resin including a conductive material such as Ag paste and Au ball. Therefore, the seal pattern 195 can have electrical conductivity. A black matrix 192, a color filter layer 190 including R, G, B sub-color filters (not shown) and a common electrode 180 are sequentially formed on an inner surface of the first substrate 105. The common electrode 180 includes a transparent material such as an indium-tin-oxide (ITO) and an indium-zinc-oxide (IZO).

An array element, such as gate lines 120 (of FIG. 1), data lines 130 (of FIG. 1), a TFT T (of FIG. 1) and a pixel electrode 170 (of FIG. 1), is formed on an inner surface of the second substrate 110 corresponding to the active area AA. The signal line 165 and the common bridge line 175 spaced apart from each other are formed in the non-active area NAA. The common bridge line 175 transmits a common signal from a common voltage generator (not shown) on the second substrate 110 to the common electrode 180 on the first substrate 105 via a transparent pattern 185 and a seal pattern 195.

Even though the potentials of the common bridge line 175 and the common electrode 180 facing each other are substantially equal, the potentials of the signal line 165 and the common electrode 180 are different from each other. The potential difference between the signal line 165 and the common electrode 180 causes a continuous generation of direct current voltage DCV.

Accordingly, the liquid crystal molecules interposed in the liquid crystal layer 115 corresponding to the common electrode 180 and the signal line 165 may be degraded by the continuously generated direct current voltage DCV.

The liquid crystal molecules degraded by the direct current voltage DCV may move to the active area AA to cause a malfunction such as flicker, cross talk and image sticking, in the LCD device. As a result, the display quality of the LCD device is deteriorated.

SUMMARY OF THE INVENTION

Accordingly, the present invention is directed to a liquid crystal display (LCD) device that substantially obviates one or more of the problems due to limitations and disadvantages of the related art.

To achieve these and other advantages and in accordance with one aspect of the invention, an array substrate for a liquid crystal display (LCD) device includes a first substrate and a second substrate each including an active area and a non-active area; a black matrix on the first substrate in the non-active area; a color filter layer on the black matrix; a common electrode on the color filter layer and black matrix; an array element on the second substrate in the active area; a plurality of signal lines and a common bridge line connected to the signal lines in the non-active area; a protective layer on the array element, signal lines and a common bridge line; a transparent pattern connected to the common bridge line and extending to a border region between the active and non-active areas; a seal pattern formed in the edge portion of the first and second substrates; and a liquid crystal layer interposed between the first and second substrates.

In another aspect of the present invention, a method of fabricating an array substrate for a liquid crystal display (LCD) device includes forming a black matrix on a first substrate having an active and a non-active area, the black matrix corresponding to the non-active area; forming a color filter layer on the black matrix; forming a common electrode on the color filter layer and black matrix; forming an array element, a plurality of signal lines and a common bridge line on a second substrate having an active and a non-active area, the black matrix corresponding to the non-active area, and the signal lines corresponding to the non-active area; forming a protective layer on the array element, signal lines and common bridge line; forming a transparent pattern connected to the common bridge line, the transparent pattern extending to a border region of the active and non-active areas; forming a seal pattern in an edge portion of the first and second substrates; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings:

FIGS. 7A to 7D are cross-sectional views taken along lines VII-VII of FIG. 4.

DETAILED DESCRIPTION OF THE ILLUSTRATED EMBODIMENTS

Reference will now be made in detail to an embodiment of the present invention, an example of which is illustrated in the accompanying drawings.

In an embodiment of the present invention, the liquid crystal display (LCD) device includes a transparent pattern extended to a border region of the active and non-active areas in order to shield the signal line, which is a source of direct current voltage.

Figure 1:
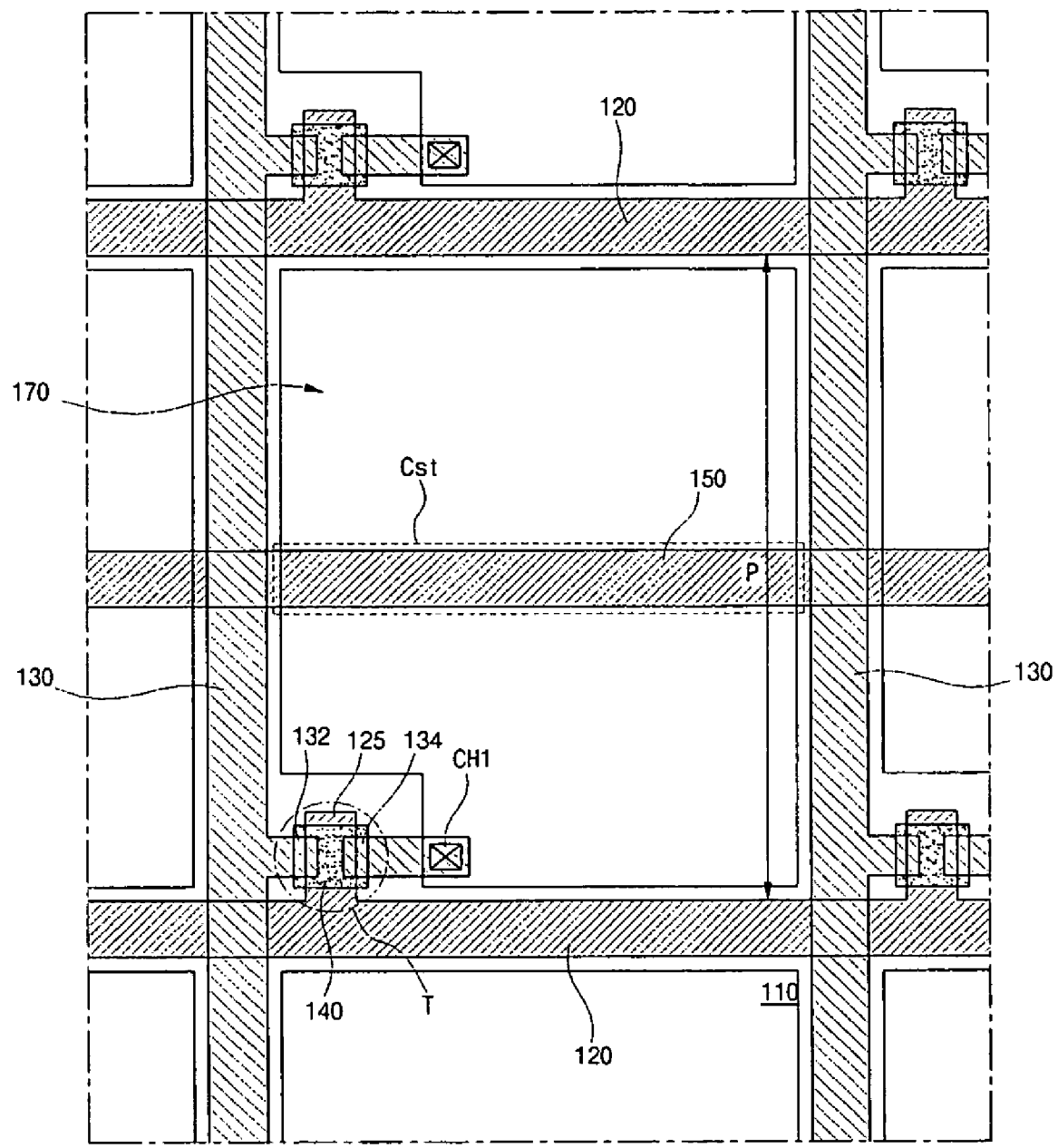
FIG. 1 is a plan view of a pixel region of an array substrate according to the related art.
Figure 2:
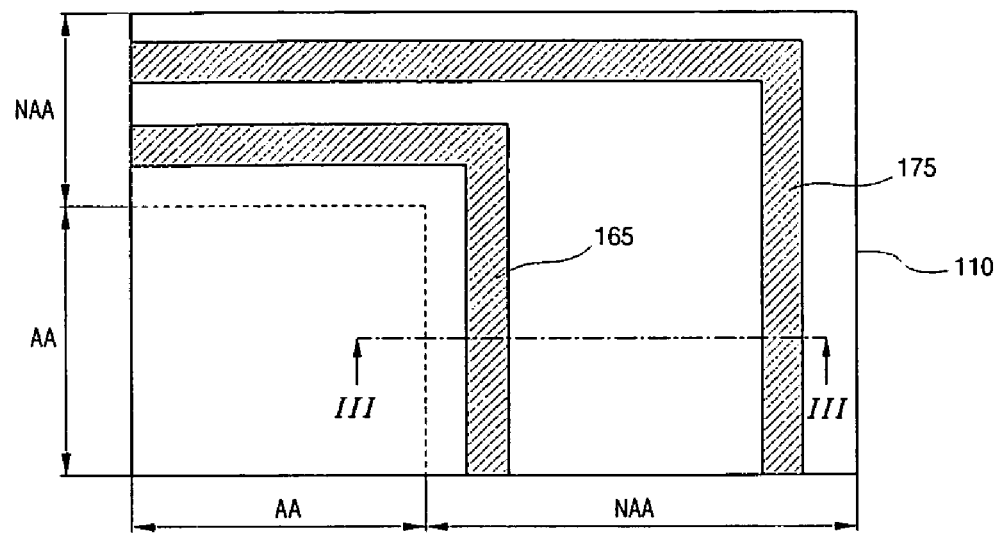
FIG. 2 is a plan view showing a part of the outermost area of an array substrate for the LCD device according to the related art.
Figure 3:
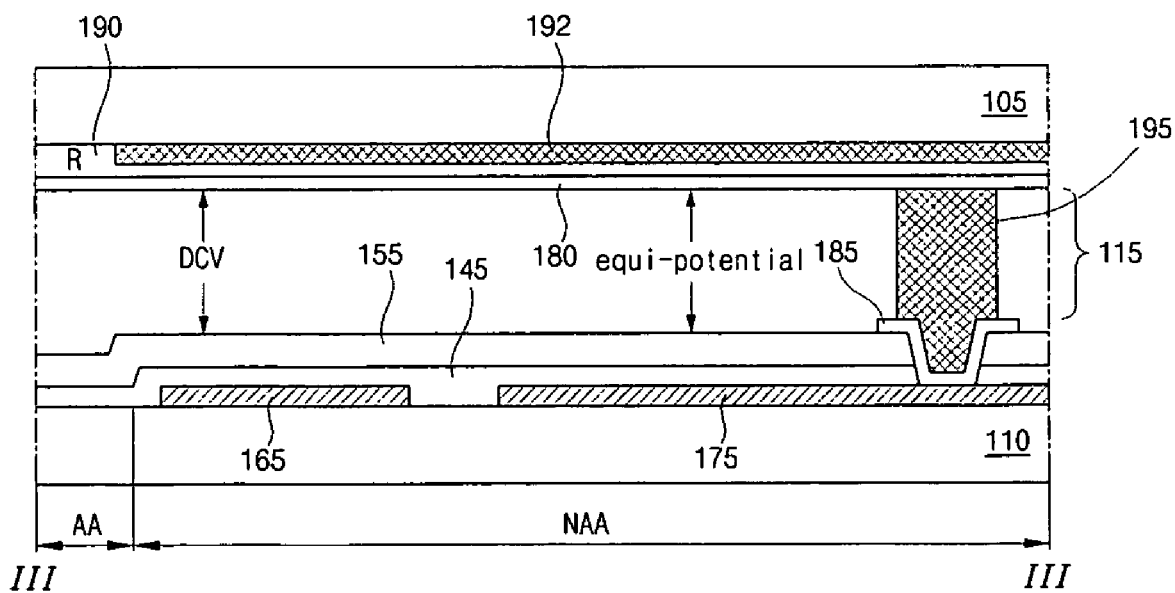
FIG. 3 is a cross-sectional view taken along lines III-III of FIG. 2.
Figure 4:
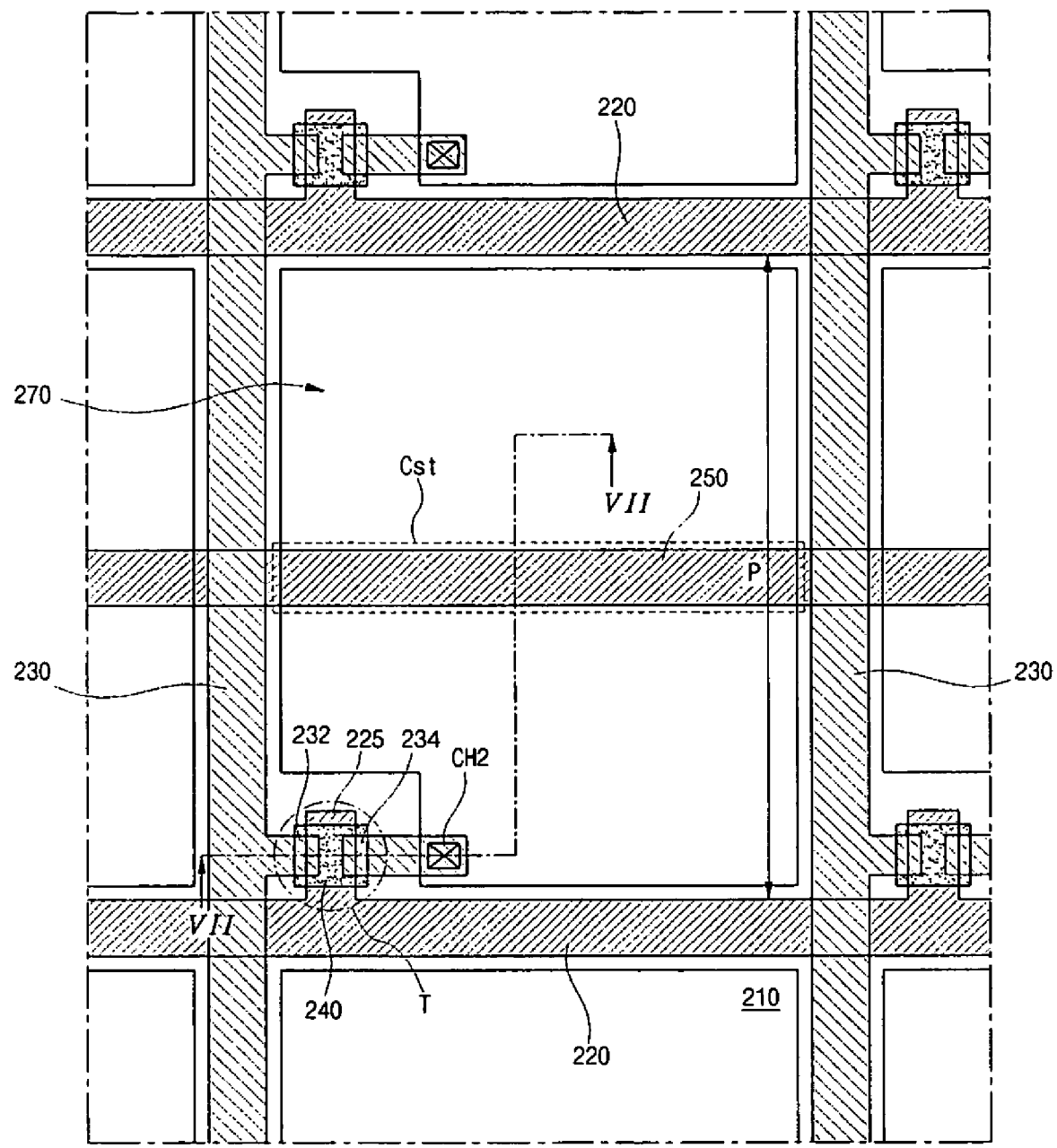
FIG. 4 is a plan view of a pixel region of an array substrate according to an embodiment of the present invention.

FIG. 4 is a plan view of a pixel region of the array substrate according to an embodiment of the present invention. As shown in FIG. 4, a plurality of gate lines 220 and a plurality of data lines 230 are formed on the substrate 210. The gate lines 220 and the data lines 230 cross each other such that a pixel region P is defined on the substrate 210. A common line 250 spaced apart from each of the gate lines 220 is formed in the middle of the pixel region P.

A TFT "T" including a gate electrode 225, a semiconductor layer (not shown), a source electrode 232 and a drain electrode 234 is disposed at a crossing portion of the gate and data lines 220 and 230. The gate electrode 225 and the source electrode 234 are connected to the gate lines 220 and the data lines 230, respectively. The source and drain electrodes 232 and 234 are spaced apart from each other on the semiconductor layer. A pixel electrode 270 is formed in the pixel region P and contacts the drain electrode 234 through a drain contact hole CH2.

The common line 250 functions as a first electrode of a storage capacitor Cst. The pixel electrode 270 overlapped with a part of the common line 250 functions as a second electrode of the storage capacitor Cst. Therefore, the first and second electrodes and a gate insulating layer (not shown) made of a dielectric material between the first and second electrodes constitute the storage capacitor Cst.

Figure 5:
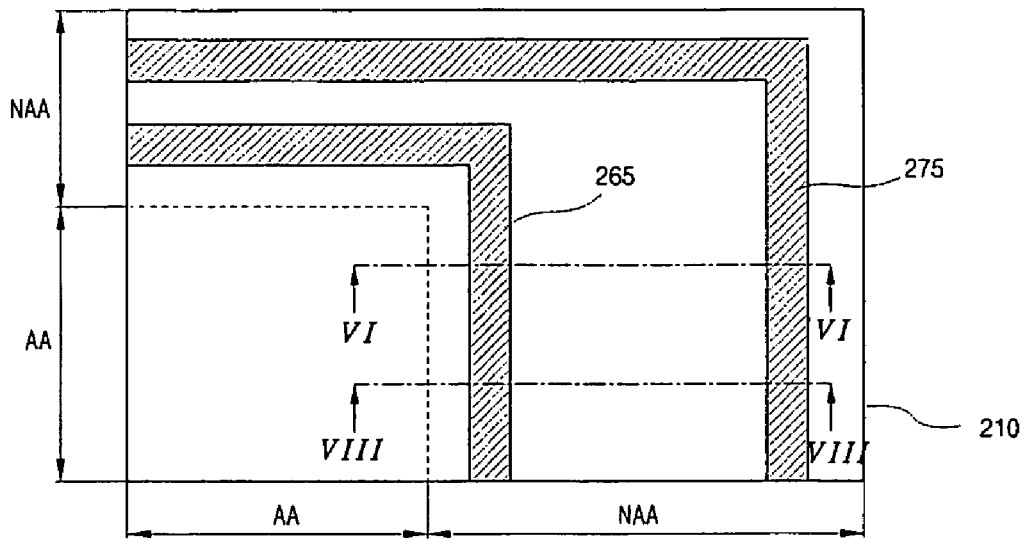
FIG. 5 is a plan view showing a part of the outermost area of an array substrate for the LCD device according to an embodiment of the present invention.

FIG. 5 is a plan view showing an outermost area of an array substrate for the LCD device according to an embodiment of the present invention. As shown in FIG. 5, an array substrate 210 includes an active area AA and a non-active area NAA. The active area AA is a region in which images are displayed and the non-active area NAA is a region in which images are not displayed. The signal for the active area AA is transmitted through the signal line 265 and the common bridge line 275.

Although not shown in FIG. 5, the signal line 265 may include diverse signal lines such as a gate bridge line, a data bridge line and a multi pattern search line. The diverse signal lines may be spaced apart from one another. Since the common bridge line 275 is connected to the common line 250 (of FIG. 4), a common signal can be transmitted from a common voltage generator on the array substrate 210 to the common electrode (not shown) on a color filter substrate (not shown) via the common bridge line 275.

FIGS. 6A to 6D are cross-sectional views which are taken along lines VI-VI of FIG. 5, showing a fabrication process according to an embodiment of the present invention. In addition, FIGS. 7A to 7D are cross-sectional views which are taken along lines VII-VII of FIG. 4, showing a fabrication process according to an embodiment of the present invention.

Figure 6A:
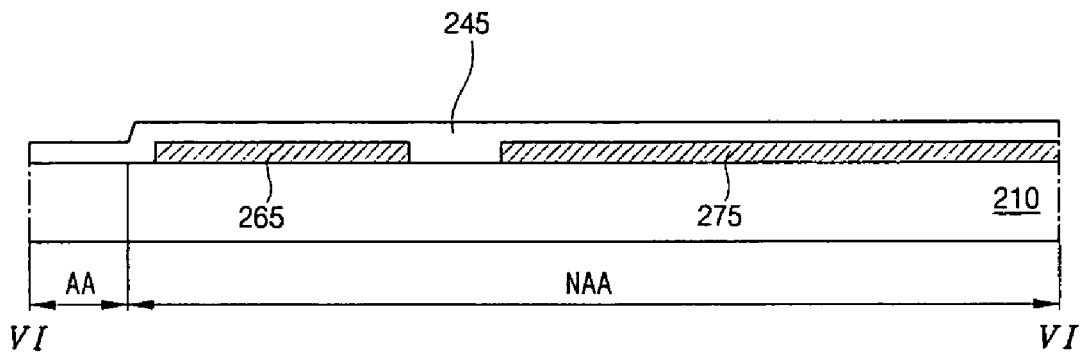
FIGS. 6A to 6D are cross-sectional views taken along lines VI-VI of FIG. 5.
Figure 7A:
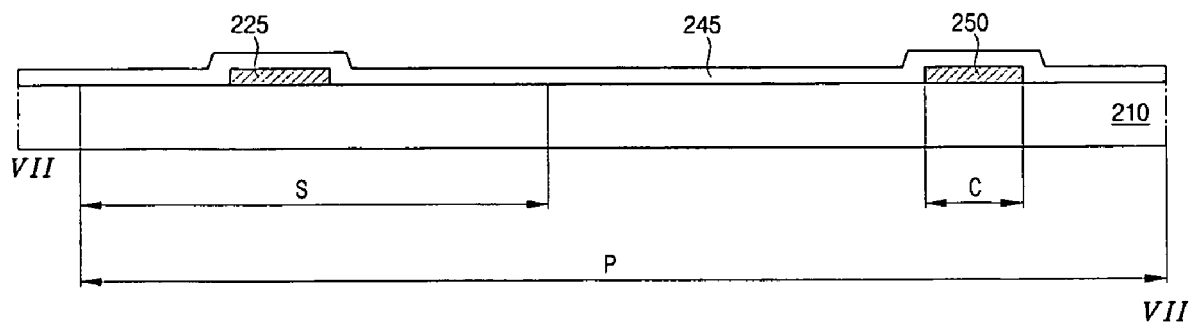

As shown in FIGS. 6A and 7A, a gate metal layer (not shown) is formed on a substrate 210 by depositing one or more selected from a conductive material group including aluminum (Al), aluminum alloy (AlNd), chromium (Cr), molybdenum (Mo), tungsten (W), titanium (Ti), copper (Cu) and tantalum (Ta).

The gate metal layer is patterned through a photo-mask process to form a gate electrode 225, gate lines 220 (of FIG. 4), a common line 250, a common bridge line 275 and a signal line 265.

The gate lines are formed on the substrate 210 and the gate electrode 225 is connected to each of the gate lines. A common line 250 is also formed in a pixel region P and functions as a first electrode of a storage capacitor Cst parallel with the gate lines. The common line 250 is connected to a common bridge line 275, which extends to the non-active area NAA. The common bridge line 275 transmits a common signal from a common signal generator on the array substrate 210 to a common electrode (not shown) on the color filter substrate (not shown) and is spaced apart from the signal line 265.

A gate insulating layer 245 is formed on the gate electrode 225, the gate lines, the common line 250, the signal line 265 and the common bridge line 275. The gate insulating layer 245 includes an inorganic insulating material group such as silicon nitride and silicon oxide.

Figure 6B:
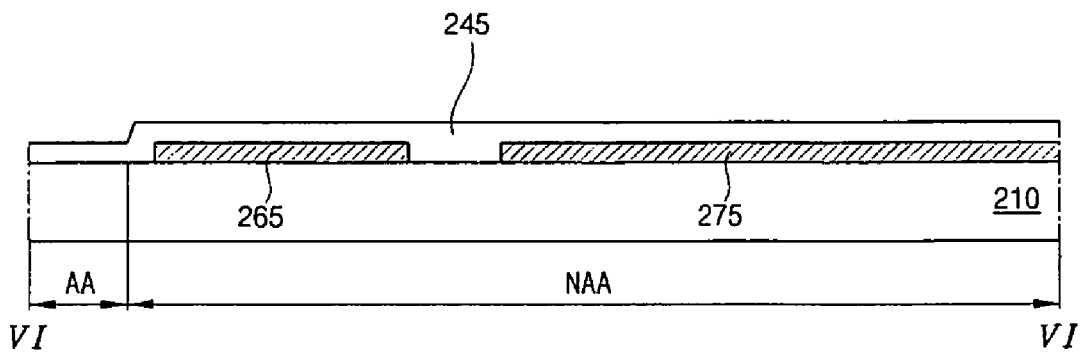

As shown in FIGS. 6B and 7B, an active layer 240 and an ohmic contact layer 241 are formed on the gate insulating layer 245. The active and ohmic contact layers 240 and 241 are overlapped with the gate electrode 225. The active and ohmic contact layers 240 and 241 are formed by patterning an intrinsic amorphous silicon layer and an impurity-doped amorphous silicon layer sequentially formed on the gate electrode 225. The active layer 240 and the ohmic contact layer 241 constitute a semiconductor layer 242.

A source-drain metallic layer is formed on the semiconductor layer 242 by depositing one or more selected from aluminum (Al), aluminum alloy (AlNd), chromium (Cr), molybdenum (Mo), tungsten (W), titanium (Ti), copper (Cu) and tantalum (Ta).

The source-drain metallic layer is patterned through a photo-mask process in order to form data lines 230 (of FIG. 4), a source electrode 232 and a drain electrode 234.

The data lines cross the gate lines to define a pixel region P. The semiconductor layer 242, the gate electrode 225, the source and drain electrodes 232 and 234 consist of a TFT T. The source electrode 232 protrudes from the data line and is spaced apart from the drain electrode 234.

Figure 6C:
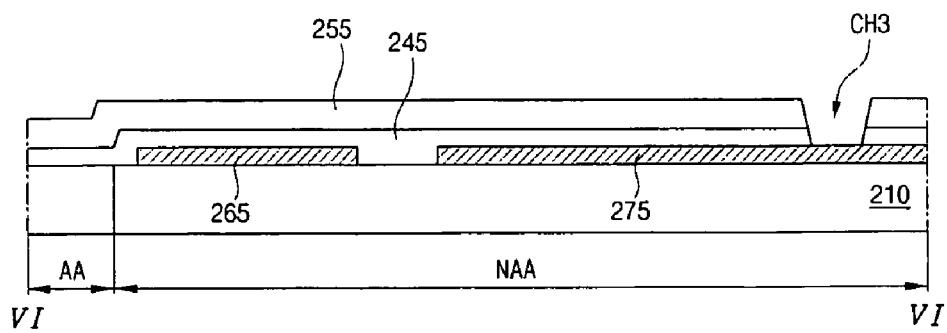

As shown in FIGS. 6C and 7C, a protective layer 255 is formed on the data lines, the source electrode 232 and the drain electrode 234. The protective layer 255 may include at least one of an inorganic insulating material such as silicon nitride and silicon oxide, or an organic insulating material such as benzocyclobutene and photo-acryl resin.

A drain contact hole CH2 and a common contact hole CH3 are formed by patterning the protective layer 255 corresponding to the drain electrode 234 and the common bridge line 275, respectively. Therefore, a portion of each of the drain electrode 234 and common bridge line 275 is exposed through the drain contact hole CH2 and the common contact hole CH3, respectively.

Figure 6D:
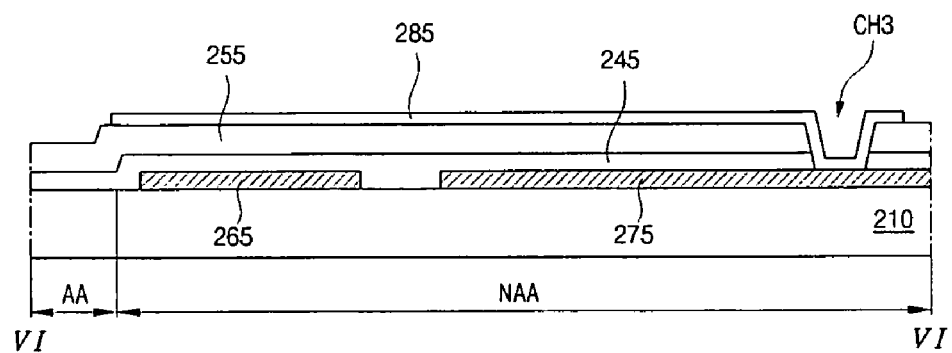
Figure 7D:
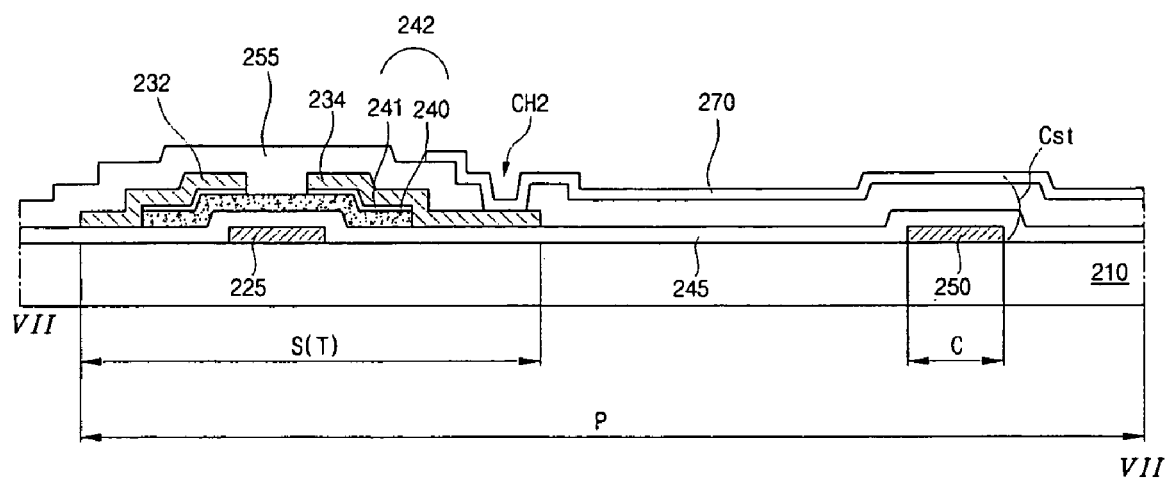

As shown in FIGS. 6D and 7D, a transparent metallic layer is formed on the protective layer 255. The transparent metallic layer is made of a transparent conductive material such as an indium-tin-oxide (ITO) and an indium-zinc-oxide (IZO).

The transparent metallic layer is patterned through a photo-mask process to form a pixel electrode 270 and a transparent pattern 285. The pixel electrode 270 connects to the drain electrode 234 via the drain contact hole CH2 is formed in the pixel region P. The transparent pattern 285 is connected to the common bridge line 275 via the common contact hole CH3 formed on the non-active area NAA. The transparent pattern 285 is formed to improve the contact characteristic between the common bridge line 275 and a seal pattern (not shown).

In an array substrate for an LCD device according to the present invention, the transparent pattern 285 extends to a border region between the active and non-active areas AA and NAA. The transparent pattern 285 shields the coupling capacitance between the signal line 265 and a common electrode (not shown). Since a substantially equal voltage is applied to the transparent pattern 285 and the common electrode by the common voltage generator, the transparent pattern 285 is made substantially equipotential with the common electrode.

In addition, the transparent pattern 285 shields the signal line 265 under the transparent pattern 285 from the common electrode. Since the transparent pattern 285 is formed together with the pixel electrode 270, an additional photo-mask process is not required.

As a result, in an array substrate for an LCD device according to the present invention, the display quality of the LCD device is improved because the transparent pattern extended to the border region of the active and non-active areas shields the signal line that is a source for generating direct current voltage DCV.

Figure 8:
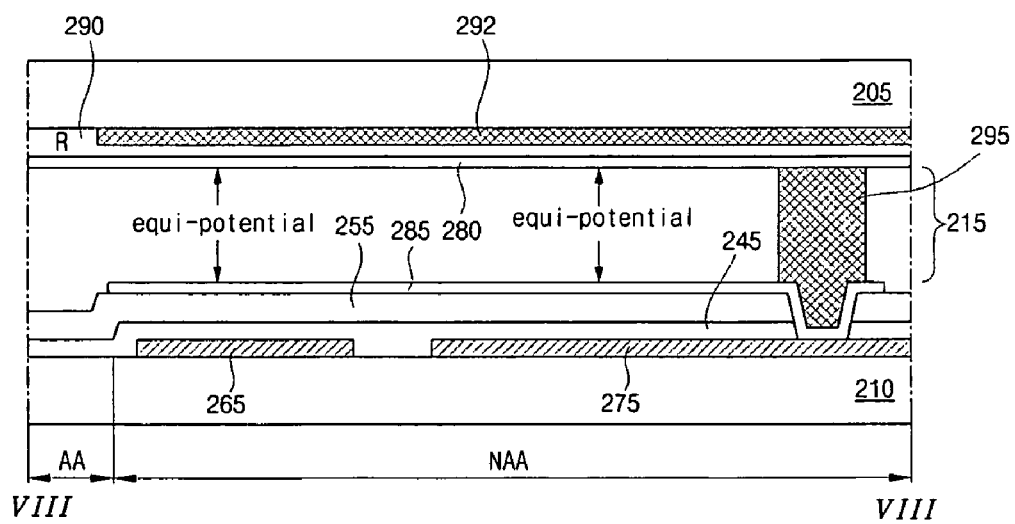
FIG. 8 is a cross-sectional view of an LCD device taken along lines VIII-VIII of the array substrate shown in FIG. 5.

FIG. 8 is a cross-sectional view of an LCD device taken along lines VIII-VIII of the array substrate shown in FIG. 5. Accordingly, FIG. 8 shows the outermost area of a LCD device according to an embodiment of the present invention. As shown in FIG. 8, the LCD device includes a first substrate 205, a second substrate 210 and a liquid crystal layer 215 interposed therebetween. The first and the second substrates 205 and 210 face and are spaced apart from each other. Each of the first and second substrates 205 and 210 includes an active area AA and a non-active area NAA.

The active area AA is defined as a region in which images are displayed and the non-active area NAA is defined as a region in which images are not displayed. Moreover, a seal pattern 295 is formed at the edge portion of the first and second substrates 205 and 210 so as to seal the liquid crystal layer 215. The seal pattern 295 is made of thermosetting resin including a conductive material such as Ag paste and Au ball. Therefore, the seal pattern 295 may have electrical conductivity. A black matrix 292, a color filter layer 290 including R, G, B sub-color filters and a common electrode 280 are sequentially formed on the inner surface of the first substrate 205. The common electrode 280 includes a transparent conductive material such as an indium-tin-oxide (ITO) and an indium-zinc-oxide (IZO).

An array element such as gate lines 220 (of FIG. 4), data lines 230 (of FIG. 4), a TFT T (of FIG. 4) and a pixel electrode 270 (of FIG. 4) is formed on an inner surface of the second substrate 210 in the active area AA. The signal line 265 and the common bridge line 275 spaced apart from each other are formed in the non-active area NAA. The common bridge line 275 on the second substrate 210 electrically contacts the common electrode 280 on the first substrate 201 via the transparent pattern 285 and the seal pattern 295.

The common bridge line 275 transmits a common signal from common voltage generator on the second substrate 210 to the common electrode 280 on the first substrate 205 via the transparent pattern 285 and the seal pattern 295.

In an array substrate for an LCD device according to the present invention, the transparent pattern 285 extends to a border region between the active and non-active areas AA and NAA. In short, the signal line 265 is completely by with the transparent pattern 285. The transparent pattern 285 shields the coupling capacitance between the signal line 265 and the common electrode 280. Since a substantially equal voltage is applied to the transparent pattern 285 and the common electrode 280 by the common voltage generator, the transparent pattern 285 forms an equipotential with the common electrode 280.

Since the same signal voltage is applied to the common electrode 280 and the transparent pattern 285 by the common voltage generator, the equipotential is obtained between the common electrode 280 and the transparent pattern 285 in the region of the LCD device corresponding to the non active area NAA.

In addition, the transparent pattern 285 shields the signal line 265 under the transparent pattern 285 from the common electrode 280. Further, because the transparent pattern 285 is formed together with the pixel electrode 290, an additional photo-mask process is not required.

As a result, in an array substrate for an LCD device according to the present invention, the display quality of an LCD device is improved because the transparent pattern extended to the border region between the active and non-active areas shields the signal line, which is a source for generating direct current voltage DCV.

Moreover, the present invention may be used with LCD devices operating in the VA (vertical alignment) mode or the ECB (electrical controlled birefringence) mode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate and a second substrate each including an active area and a non-active area;
   a black matrix on the first substrate in the non-active area;
   a color filter layer on the black matrix;
   a common electrode on the color filter layer and black matrix;
   an array element on the second substrate in the active area;
   a plurality of signal lines and a common bridge line in the non-active area;
   a protective layer on the array element, signal lines and a common bridge line;
   a transparent pattern connected to the common bridge line and extending to a border region between the active and non-active areas;
   a seal pattern formed in an edge portion of the first and second substrates; and
   a liquid crystal layer interposed between the first and second substrates,
   wherein the common electrode is electrically connected to the common bridge line through the transparent pattern and the seal pattern,
   wherein the transparent pattern completely shields the plurality of signal lines, and
   wherein a region that the transparent pattern overlaps the seal pattern is outside a region that the transparent pattern shields the plurality of signal lines.

2. The LCD device according to claim 1, wherein the seal pattern includes one of Au ball and Ag paste.

3. The LCD device according to claim 1, wherein the transparent pattern includes one of an Indium-Tin-Oxide (ITO) and Indium-Zinc-Oxide (IZO).

4. The LCD device according to claim 1, wherein the common bridge line supplies a common signal from a common signal generator on the second substrate to the common electrode on the first substrate, and is spaced apart from the signal lines.

5. The LCD device according to claim 1, wherein the common bridge line is connected to a common line in the active area.

6. A method of fabricating a liquid crystal display device, comprising:
   forming a black matrix on a first substrate having an active area and a non-active area, the black matrix corresponding to the non-active area;
   forming a color filter layer on the black matrix;
   forming a common electrode on the color filter layer and black matrix;
   forming an array element, a plurality of signal lines and a common bridge line on a second substrate having an active area and a non-active area and the signal lines corresponding to the non-active area;
   forming a protective layer on the array element, signal lines and common bridge line;
   forming a transparent pattern connected to the common bridge line, the transparent pattern extending to a border region between the active and non-active areas;
   forming a seal pattern in an edge portion of the first and second substrates; and
   forming a liquid crystal layer between the first and second substrates,
   wherein the common electrode is electrically connected to the common bridge line through the transparent pattern and the seal pattern,
   wherein the transparent pattern completely shields the plurality of signal lines, and
   wherein a region that the transparent pattern overlaps the seal pattern is outside a region that the transparent pattern shields the plurality of signal lines.

7. The method according to claim 6, wherein the seal pattern includes one of Au ball and Ag paste.

8. The method according to claim 6, wherein the transparent pattern includes one of an Indium-Tin-Oxide (ITO) and Indium-Zinc-Oxide (IZO).

9. The method according to claim 6, wherein the common bridge line transmits a common signal from a common signal generator on the second substrate to the common electrode on the first substrate, and is spaced apart from the signal lines.

10. The method according to claim 6, further comprising forming a common line in the active area, where the common line is connected to the common bridge line corresponding to the non active area.

* * * * *